(12) United States Patent
Dangi et al.

(10) Patent No.: US 11,455,281 B2
(45) Date of Patent: Sep. 27, 2022

(54) GENERATING AND MORPHING A COLLECTION OF FILES IN A FOLDER/SUB-FOLDER STRUCTURE THAT COLLECTIVELY HAS DESIRED DEDUPABILITY, COMPRESSION, CLUSTERING AND COMMONALITY

(71) Applicant: EMC IP Holding Company LLC, Hopkinton, MA (US)

(72) Inventors: Salil Dangi, Mission Viejo, CA (US); Ernest Daza, Aliso Viejo, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 453 days.

(21) Appl. No.: 16/389,741

(22) Filed: Apr. 19, 2019

(65) Prior Publication Data

US 2020/0334215 A1    Oct. 22, 2020

(51) Int. Cl.
| | | |
|---|---|---|
| *G06F 16/188* | (2019.01) | |
| *G06F 16/18* | (2019.01) | |
| *G06F 16/174* | (2019.01) | |
| *G06F 16/13* | (2019.01) | |

(52) U.S. Cl.
CPC ............ *G06F 16/192* (2019.01); *G06F 16/13* (2019.01); *G06F 16/1748* (2019.01); *G06F 16/1873* (2019.01); *G06F 16/196* (2019.01)

(58) Field of Classification Search
None
See application file for complete search history.

(56) References Cited

U.S. PATENT DOCUMENTS

| | | | |
|---|---|---|---|
| 6,816,093 B1 | 11/2004 | Jaquette | |
| 8,223,673 B2 | 7/2012 | Miriyala et al. | |
| 9,152,545 B1* | 10/2015 | VonThenen | ......... G06F 11/1448 |
| 10,038,733 B1 | 7/2018 | Dangi et al. | |
| 10,114,832 B1 | 10/2018 | Dangi et al. | |
| 10,114,850 B1 | 10/2018 | Dangi et al. | |
| 10,163,371 B1 | 12/2018 | Dangi et al. | |
| 10,235,134 B1 | 3/2019 | Dangi et al. | |
| 2005/0132123 A1* | 6/2005 | Glaum | ...................... G06F 8/63 |
| | | | 711/100 |
| 2006/0150229 A1 | 7/2006 | Blair | |
| 2012/0114310 A1 | 5/2012 | Hymel et al. | |
| 2014/0118541 A1 | 5/2014 | Lasko | |

(Continued)

FOREIGN PATENT DOCUMENTS

WO    2016137203    9/2016

OTHER PUBLICATIONS

International Search Report and Written Opinion issued in Application No. PCT/US2019/066632.

(Continued)

*Primary Examiner* — Scott A. Waldron
(74) *Attorney, Agent, or Firm* — Workman Nydegger

(57) ABSTRACT

One example method includes receiving a set of filesystem parameters, creating a simulated filesystem based on the filesystem parameters, receiving a set of target characteristics for a file collection, based on the target characteristics, slicing a datastream into a grouping of data slices, populating the simulated files with the data slices to create the file collection and forward or reverse morphing the file collection from one generation to another without rewriting the entire file collection.

17 Claims, 9 Drawing Sheets

Generating Collection from a Datagen stream
Simulate file system, slice data stream and populate files

(56) References Cited

U.S. PATENT DOCUMENTS

2014/0279874 A1 9/2014 Reiter
2016/0103757 A1 4/2016 Liu
2017/0220593 A1 8/2017 Tripathy et al.
2019/0034450 A1 1/2019 Dangi et al.

OTHER PUBLICATIONS

International Search Report and Written Opinion issued in Application No. PCT/US2019/066619.
U.S. Appl. No. 16/389,729, Jun. 4, 2020, Office Action.
U.S. Appl. No. 16/389,700, Jun. 1, 2020, Office Action.
International Search Report and Written Opinion for PCT/US2019/053878 dated Jan. 31, 2020.
Universal Mobile Telecommunications System; Multiplexing and channel coding; Technical Specification, European Telecommunications Standards Institute Sophia Antipolis Cedex. France, vol. 3-R1, No. v7.3.0 Dec. 1, 2006, XP014036328.
"Data Compression/Evaluating Compression Effectiveness" internet article, Feb. 21, 2017, XP002796742, accessed on Jan. 9, 2020 via:https://en.wikibooks.org/w/index.php?title=Data_Compression/Evaluating_Compression_Effectiveness&oldid=3164899.
U.S. Appl. No. 16/389,671, Jan. 8, 2020, Notice of Allowance.
U.S. Appl. No. 16/389,671, filed Apr. 19, 2019, Dangi et al.
U.S. Appl. No. 16/389,729, filed Apr. 19, 2019, Dangi et al.
U.S. Appl. No. 16/389,700, filed Apr. 19, 2019, Dangi et al.

\* cited by examiner

Collection dataset simulation

Generating Collection from a Datagen stream
Simulate file system, slice data stream and populate files

Morphing Collection dataset from Datagen streams
Only a small part of file E and file I are overwritten

GENERATING AND MORPHING A COLLECTION OF FILES IN A FOLDER/SUB-FOLDER STRUCTURE THAT COLLECTIVELY HAS DESIRED DEDUPABILITY, COMPRESSION, CLUSTERING AND COMMONALITY

RELATED APPLICATIONS

This application is related to: U.S. Pat. No. 10,038,733 (Ser. No. 14/489,317, filed Sep. 17, 2014), entitled GENERATING A LARGE, NON-COMPRESSIBLE DATA STREAM, issued Jul. 31, 2018; U.S. Pat. No. 10,114,832 (Ser. No. 14/489,363, filed Sep. 17, 2014), entitled GENERATING A DATA STREAM WITH A PREDICTABLE CHANGE RATE, issued Oct. 30, 2018; U.S. Pat. No. 10,114,850 (Ser. No. 14/489,295, filed Sep. 17, 2014), entitled DATA STREAM GENERATION USING PRIME NUMBERS, issued Oct. 30, 2018; U.S. Pat. No. 10,235,134 (Ser. No. 15/420,614, filed Jan. 31, 2017), entitled ROTATING BIT VALUES WHILE GENERATING A LARGE, NON-COMPRESSIBLE DATA STREAM, issued Mar. 19, 2019; and, U.S. Pat. No. 10,163,371, (Ser. No. 15/420,633, filed Jan. 31, 2017), entitled ROTATING BIT VALUES BASED ON A DATA STRUCTURE WHILE GENERATING A LARGE, NON-COMPRESSIBLE DATA STREAM, issued Dec. 25, 2018. This application is also related to: United States Patent Application (Ser. No. 16/389,671), entitled GENERATING A DATA STREAM WITH CONFIGURABLE COMPRESSION, filed the same day herewith; United States Patent Application (Ser. No. 16/389,700), entitled GENERATING A DATA STREAM WITH CONFIGURABLE COMMONALITY, filed the same day herewith; and, United States Patent Application (Ser. No. 16/389,729), entitled GENERATING A DATA STREAM WITH CONFIGURABLE CHANGE RATE AND CLUSTERING CAPABILITY, filed the same day herewith. All of the aforementioned patents and applications are incorporated herein in their respective entireties by this reference.

FIELD OF THE INVENTION

Embodiments of the present invention generally relate to generation of datastreams having various attributes. More particularly, at least some embodiments of the invention relate to systems, hardware, software, computer-readable media, and methods for generating a collection of files based on datastreams that have desired parameters.

BACKGROUND

Developers and other personnel often have a need to simulate datastreams that are generated by applications that are in a developmental stage. Simulation of the datastreams enables the developer to identify and correct any problems, and enhance performance of the application, before the application is rolled out.

Various algorithms have been developed for generation of datastreams. Data streams generated by these algorithms may have a variety of desirable characteristics but such datastreams may be better suited for some applications than for others.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
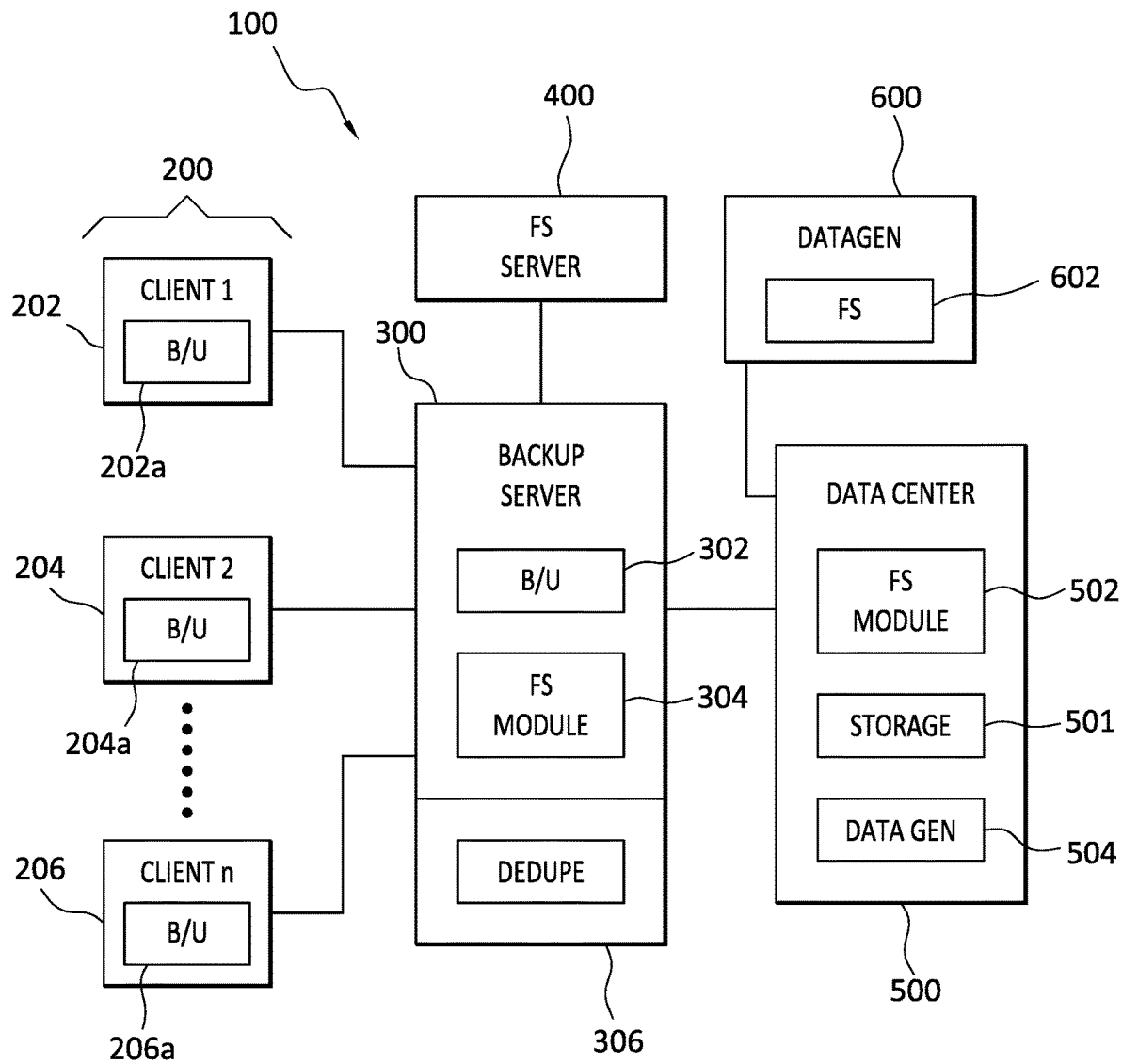
FIG. 1 discloses aspects of an example operating environment for some embodiments of the invention.

Embodiments of the present invention generally relate to generation of datastreams having various attributes. More particularly, at least some embodiments of the invention relate to systems, hardware, software, computer-readable media, and methods for generating a collection of files based on datastreams that have desired characteristics.

In more detail, example embodiments of the invention may be employed in connection with various types of datastreams including, for example, datastreams that have particular characteristics. Such characteristics include, but are not limited to, dedupability (that is, the extent, if any, to which the datastream can be deduplicated), compressibility, commonality, data change rate, and clustering, for example. It is noted that dedupability may be present within a single datastream and/or across multiple datastreams. Systems and methods for generating such datastreams are disclosed in the Related Applications.

Example embodiments of the present invention are implemented in connection with a file system that has a user-defined file structure. More particularly, a number of parameters such as total size of the collection of files, collection growth, average size of each entity in the collection, variance in the size of the entities in the collection, distribution of collection entities at each folder and sub-folder, and the minimum, maximum, variance at each folder level, are collected and used to create a simulated file structure of a filesystem. Then, each entity that is to be included in the filesystem is sequentially created, and the entities are populated with data from a datastream. Where multiple datastreams are employed, the entities need not be created sequentially.

In this way, various characteristics of the datastream, or datastreams, are imparted to the files in the filesystem. Considered from another perspective, embodiments of the invention generate and morph a collection of files in a filesystem having a specified folder/sub-folders file structure configuration, so that the resulting grouping of files collectively possesses characteristics, such as dedupability, compression, clustering and commonality, for example, desired by a customer. The following example is illustrative.

The generation of a base collection of files may involve taking an L0 (which can also be referred to as day 0 in some contexts) version of a datastream having particular characteristics, and then using data from that datastream to populate the simulated files to generate a base file collection with those characteristics. Embodiments of the invention are not limited solely to generation of base file collections however.

For example, other embodiments of the invention provide for morphing a collection of files, either in forward or in reverse, to another version of that collection of files. This will be briefly illustrated below with an example in which a collection of files is forward morphed from generation # N−1 to generation # N.

This particular morphing example involves generating Ln (day n) and Ln−1 (day n−1) versions of datastreams in memory, and then comparing these with each other in smaller chunks, such as 1 KB for example. The chunk size can be selected as needed. By way of illustration, in an embodiment that simulates the operation of a tracker, such as VM (VMware) CBT (Changed Block Tracking) for example, that tracks changes at a 64 KB level, the chunk size can be 64 KB. When a difference is identified, that is, when a generation N version of a block in a file is different from the generation N−1 version of the block, the generation N−1 version of the block is overwritten with the generation N version of the block. Since the data generation speed may be extremely high, both the datastream comparison process and the file collection morphing process can be performed at high speed. Moreover, since all existing entities are neither read nor written again, only the impacted files and only the impacted areas are altered. As disclosed in more detail elsewhere herein, and in the Related Applications, file collection morphing can be performed without ad hoc datastream generation, through the use of masks.

Advantageously then, embodiments of the invention may provide various benefits and improvements relative to the configuration and operation of conventional hardware, software, systems and methods. For example, an embodiment of the invention provides for high speed generation of file collections that have desired characteristics imparted by the data upon which the file collection was generated. An embodiment of the invention is particularly well suited for testing and evaluation of a backup application and associated components and processes, since some backup applications are not configured to handle datastreams, but can handle data in the form of file collections. Further, an embodiment of the invention can operate to morph a file collection at the same speed, or nearly so, as the speed at which a datastream is generated. An embodiment of the invention eliminates the need to copy entire files and/or collections and instead writes only the data that has changed.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with the testing, analysis, diagnosis, and evaluation, of systems, software, and components, that individually and/or collectively implement, and/or cause the implementation of, data generation and data management operations. Such data management operations may include, but are not limited to, data read/write/delete operations, data deduplication operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful.

In some instances, embodiments of the invention generate datastreams for use in testing systems and applications in various environments, one example of which is a data protection environment.

A data protection environment, for example, may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications that generate data that is desired to be protected. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by datastream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, one example of an operating environment is denoted generally at 100. In some embodiments, the operating environment may comprise, consist of, or be a part of, a data protection environment, although none of these arrangements is required. The operating environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In the illustrated example, the operating environment 100 generally includes a plurality of clients 200 that communicate with one or more backup servers 300. The backup server 300 communicates with a filesystem synthesis server 400 and a datacenter 500, which may be a cloud datacenter in some embodiments, though that is not required. Finally, a datastream generator 600 communicates with the datacenter 500, simulation server 400, and backup server 300. Further details concerning each of these components is provided in the following discussion.

The clients 200 may comprise any number of clients from 1 . . . n. In the example of FIG. 1, clients 202, 204 and 206 are indicated. Each of the clients 200 includes a respective instance of backup agent 202a, 204a, and 206a, respectively. The backup agents 202a, 204a, and 206a cooperate with a backup application 302 on the backup server 300 to create backups of client 200 data for storage at the datacenter 500.

The backup server 300 can include, in addition to the backup application 302, a filesystem synthesis module 304, and a deduplication engine 306. In general, and as discussed in more detail elsewhere herein, the filesystem synthesis module 304 operates to generate a simulated filesystem with a file structure that includes one or more directories and sub-directories. As well, the filesystem synthesis module 304 operates to populate the filesystem with data generated by the datastream generator 600. Further details concerning an example filesystem synthesis module 304 are set forth in the discussion of FIG. 2 below. The deduplication engine 306 deduplicates backups, including files, generated by the backup application 302 and then transmits the deduplicated data to the datacenter 500 for storage in the datacenter storage 501. In some embodiments, the filesystem synthesis module 304 and/or the deduplication engine 306 may be hosted at respective stand-alone servers, rather than being integrated in a backup server 300 or other component.

Thus, and with continued reference to FIG. 1, some implementations include a stand-alone filesystem server 400 that communicates with the backup server 300 and transmits a collection of simulated files to the backup server 300 for use by the backup application 302. In still other embodiments, a filesystem synthesis module 502 is included as an element of the datacenter 500, or a filesystem synthesis module 602 can be included as an element of the datastream generator 600. As well, in some implementations, the datastream generator 600 may be omitted, and the datastream functionality implemented by a datastream generation module 504 of the datacenter.

As will be apparent from the configuration and discussion of FIG. 1, the functional allocations disclosed herein are presented only by way of example. In general, the disclosed functions can be allocated amongst elements of the operating environment 100 in any other suitable manner, and the scope of the invention is not limited to the disclosed configurations and arrangements.

With continued reference to FIG. 1, a brief introductory discussion is provided concerning operational aspects of some of the disclosed elements. In general, the datastream generator 600 operates to generate one or more high speed datastreams with various desired characteristics. These datastreams are provided, or otherwise made accessible to, simulation logic such as the filesystem synthesis module 304. The filesystem synthesis module 304, creates, based on the datastream and its associated characteristics, a simulated filesystem having a file structure that includes files, directories, and sub-directories. The simulated filesystem is then populated with data from the datastream to create a collection of files that collectively possess the datastream characteristics and which can be used to test the operation and performance of the backup application 302 and/or deduplication engine 306, among others. The collection of files created by the filesystem synthesis module 304 can be morphed forward or backward one or more generations by the filesystem synthesis module 304, using different generations of the datastreams and/or through the use of masks, examples of which are disclosed in the Related Applications.

Figure 2:
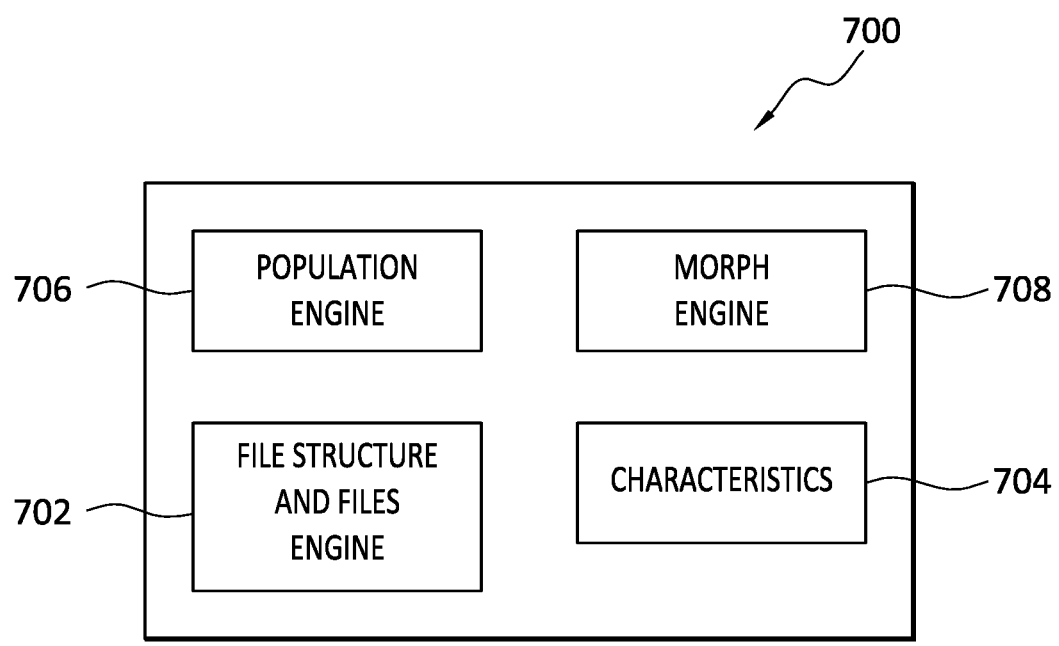
FIG. 2 discloses aspects of an example filesystem synthesis module.

With reference now to FIG. 2, details are provided concerning an example implementation of a simulation server 700 which may comprise, or consist of, simulation logic that may or may not be in the form of a filesystem synthesis module. In the illustrated example, the simulation server 700 may include a file structure and files engine 702 that, in general, operates to create a simulated filesystem that includes a particular file structure and simulated files. The particular characteristics of the file structure and files can be specified in a characteristics file or module 704 that, in some embodiments at least, is configured to receive input from a user. The population engine 706 receives data from one or more datastreams created by a datastream generator and populates the files with that data. Finally, a morph engine 708 operates to morph a collection of files, cooperatively created by the file structure and files engine 702 and the population engine 706, forward or backward one or more generations. Morphing can be performed using data from one or more datastreams and/or through the use of one or more masks that indicate changes that have occurred to data over one or more generations of a datastream.

B. Example Host and Server Configurations

Figure 3:
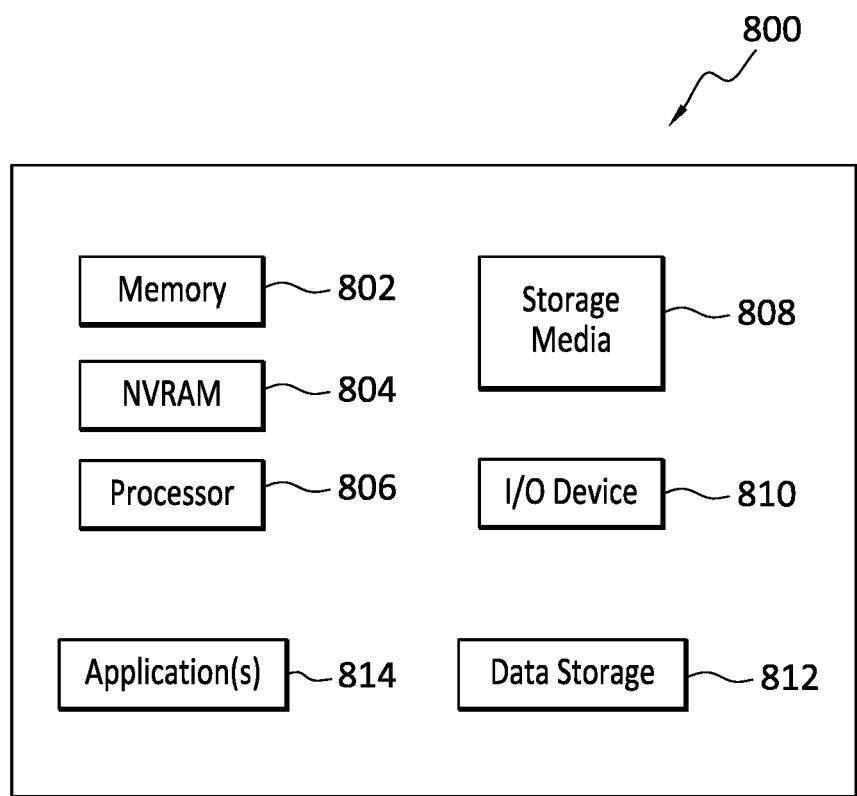
FIG. 3 discloses aspects of an example host configuration.

With reference briefly now to FIG. 3, any one or more of the clients 200, backup agents 202a, 204a, 206a, the backup server 300, backup application 302, filesystem synthesis module 304, deduplication engine 306, filesystem synthesis server 400, datacenter 500, storage 501, filesystem synthesis module 502, datastream generator 504, datastream generator 600, filesystem synthesis module 602, file structure and files engine 702, characteristics data 704, population engine 706, and morph engine 708 can take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 3.

In the example of FIG. 3, the physical computing device 800 includes a memory 802 which can include one, some, or all, of random access memory (RAM), non-volatile random access memory (NVRAM) 804, read-only memory (ROM), and persistent memory, one or more hardware processors 806, non-transitory storage media 808, I/O device 810, and data storage 812. One or more of the memory components 802 of the physical computing device 800 can take the form of solid state device (SSD) storage. As well, one or more applications 814 are provided that comprise executable instructions. Such executable instructions can take various forms including, for example, instructions executable to perform any method or portion thereof disclosed herein, and/or executable by/at any of a storage site, whether on-premises at an enterprise, or a cloud storage site, client, datacenter, backup server, or network node, to perform functions disclosed herein. As well, such instructions may be executable to perform part, or all of, any of the other operations and processes disclosed herein including, but not limited to, datastream generation, file generation, file structure generation, morphing, populating, deduplication, data storage and retrieval, as well as read, write, backup, clone, and restore, operations and/or any other data protection operation, auditing operations, cloud service operations.

C. Creation of Simulated Filesystem

Figure 4:
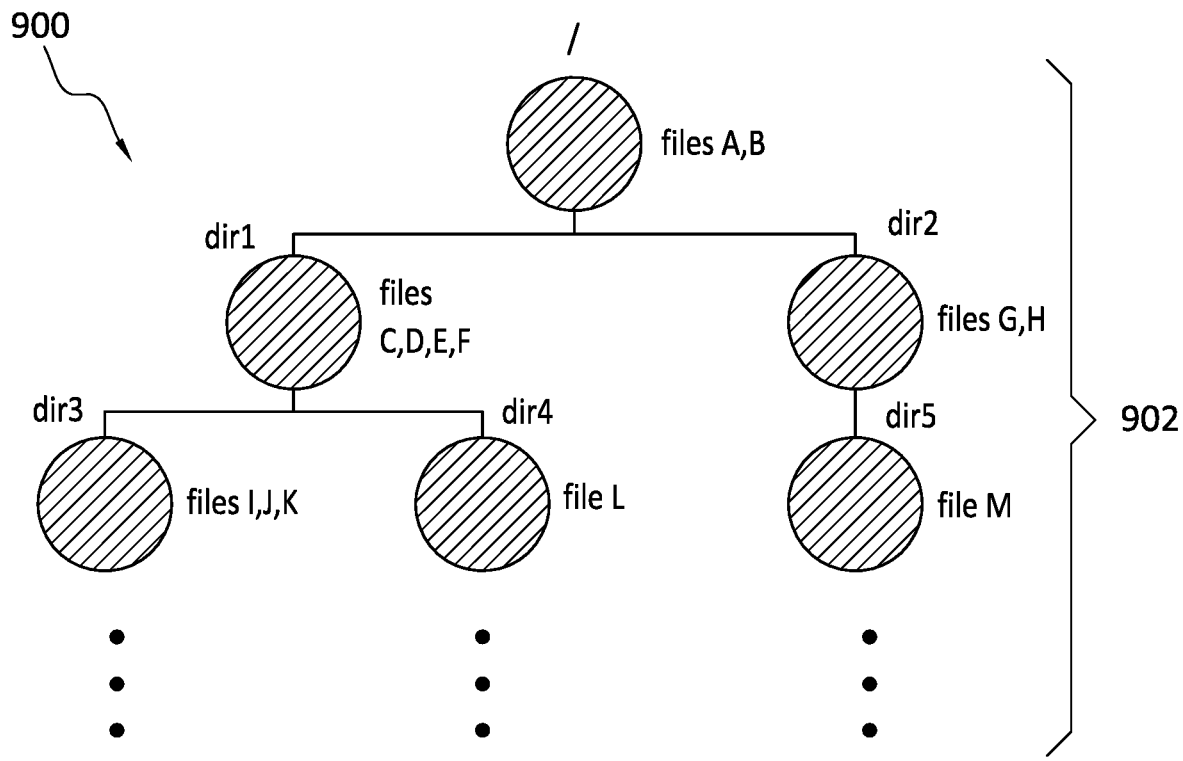
FIG. 4 discloses an example filesystem and file structure scheme.

Directing attention now to FIG. 4, details are provided concerning systems and processes for generating simulated filesystems and files that can be used for example, to test and evaluate the performance of applications, such as a backup application for example. Such filesystems and files may be referred to herein as 'simulated' because they are not 'real world' files that have been generated by applications operating in a production environment, but are instead configured to closely mimic real world files and data. As noted, data used to populate the simulated files can be generated by a datastream generator. Until the population process is performed, there are no actual files in the simulated filesystem. Instead only simulated files that are not yet populated with data are initially present in the simulated filesystem. The files and directories in the filesystem can be created in various ways. For example, empty files and directories can all be created before any data population is performed. Alternatively, the files and directories can be created, and populated, on an individual basis. Finally, the simulated filesystem can be of any type, and the scope of the invention is not limited to any particular type of filesystem(s). Some example simulated filesystems include Windows NTFS, ReFS, ExFAT, Linux ext4, btrfs, zfs, and Mac.

As indicated in FIG. 4, an example simulated filesystem 900 is disclosed that has a file structure 902. The filesystem 900 and associated file structure 902 can be specified by a user. In general, the file structure can be of any size and configuration, and include any number and size of directories and files. As well, each entity, or file, in the filesystem 900 has a simulated size as specified by various input parameters, as discussed in more detail below. Thus, the file structure 902 shown in FIG. 4 is presented only for the purposes of illustration and is not intended to limit the scope of the invention in any way.

Embodiments of the invention are flexible in terms of the filesystem 900 parameters that can be specified, such as by a user, or by a computing entity, for example. Those parameters include, but are not limited to: configuration of the file structure 902 including the structural relationships and arrangements between/among files, directories, and/or sub-directories; size of files; number of files; types of files; number of directories; number of sub-directories; size/number/type(s) of files in a directory/sub-directory; particular distribution of files throughout the file structure; total size of the file system; and, the size and content of directories and sub-directories. The values for any of these parameters can be specified and stored for later use, or can be provided to the system in real time and inline as part of a test and evaluation procedure involving, for example, a backup application and/or deduplication engine.

As noted, the collection of simulated files in the filesystem 900 can be populated with data from a datastream generated by a datastream generator. Thus, not only can parameters of the filesystem 900 be specified, but parameters particularly concerning the simulated files can be specified as well. These may be referred to herein as file collection parameters as they concern the particular collection of files in the filesystem 900. Such file collection parameters include, but are not limited to: total size of the file collection; collection growth; average size of each entity (file) in the collection; variance in the size of the entities in the collection; distribution of collection entities at each folder and sub-folder; and, minimum/maximum/variance at each folder level. Along with the filesystem parameters, the file collection parameters are collected and used to build the simulated filesystem 900.

In some embodiments, the simulated filesystem 900 is created ad hoc, based on user input. In other embodiments, the simulated filesystem 900 can be created automatically by drawing one or more parameters from another simulated filesystem and/or from an actual real world file system.

Finally, the file structure 902 may, but need not necessarily, mimic an actual or anticipated real world file structure that is to be backed up with a backup application. Because backup applications are typically configured to operate in connection with files and filesystems, the simulated filesystem 900 provides a good mechanism to test the performance and operation of a backup application and/or a deduplication application/engine. Thus, testing and performance results obtained with a simulated filesystem, as provided by embodiments of the invention, can provide useful insights into the backup application and deduplication application/engine performance and functionality. For example, one or more embodiments of the invention can be used to determine the best and most effective way of backing up a file system. Particularly, by walking the file structure in various ways, and knowing the good/bad points of the dedupe engine, collectively a better backup mechanism can be developed.

D. Creation of Simulated File Collection

Figure 5:
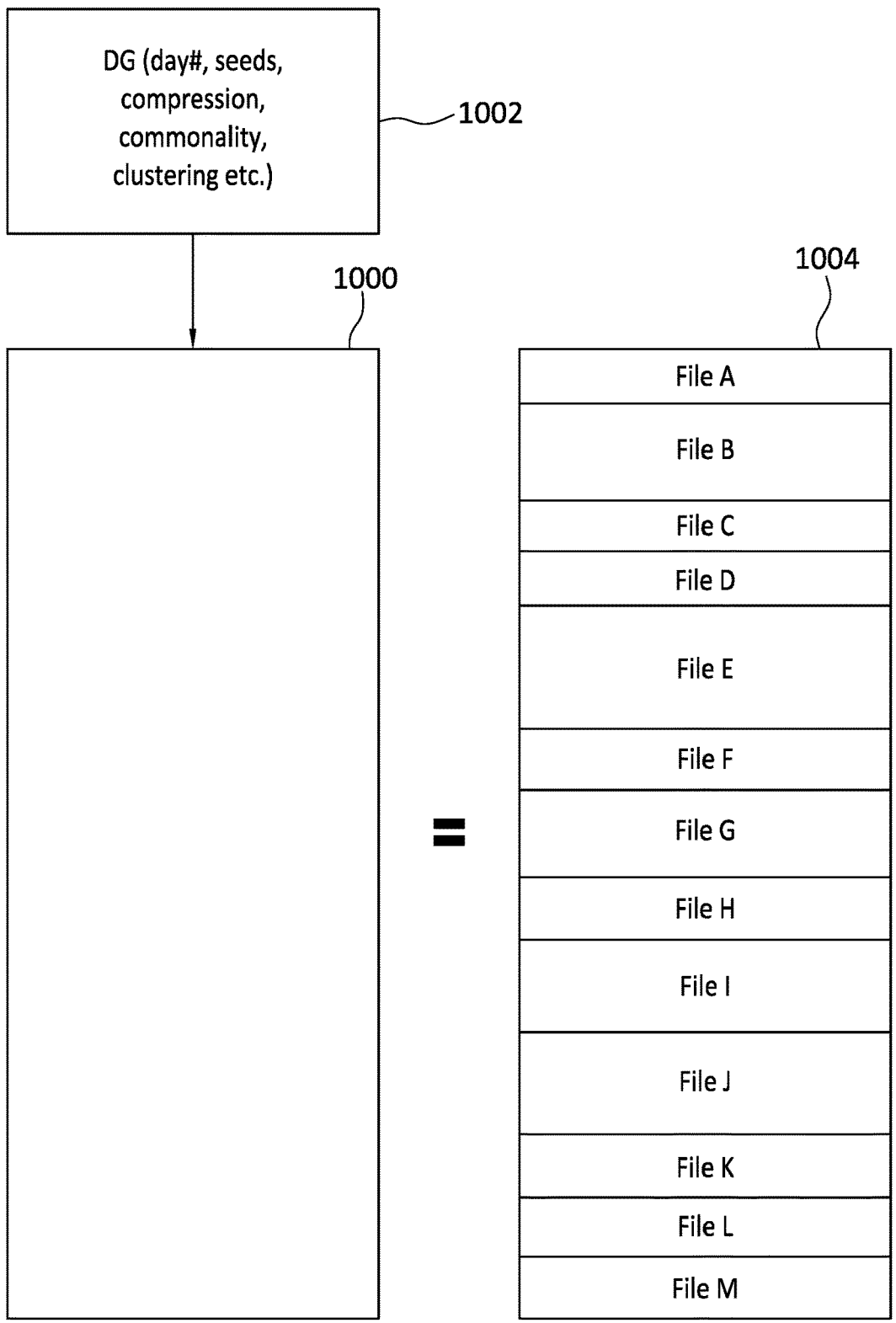
FIG. 5 discloses an example arrangement in which a datastream is sliced into files.

With reference now to FIG. 5, details are provided concerning an example structure and process for generating a collection of files using data from a datastream created by a datastream generator. As shown in FIG. 5, a datastream 1000 is generated that embodies various specified characteristics 1002 that are desired to be imparted to the collection of files that will be created using data from the datastream 1000. Detailed information concerning both the characteristics, and generation, of the datastream, are set forth in the Related Applications and, as such, an in-depth discussion of those elements is not provided here. In general however, some example characteristics 1002 of the datastream 1000 that can be specified in connection with the creation of the datastream 1000, and which can be reflected in a file collection created using data from that datastream 1000, may include, but are not limited to, dedupability, compression, clustering, and commonality.

When the datastream 1000 has been created with the desired characteristics 1002, the datastream 1000 is sliced up into portions 1004 whose respective sizes correspond to the respective sizes of the simulated files in the filesystem 900. The collective characteristics of the portions 1004 correspond to the desired characteristics of the file collection that is to be included in the filesystem 900.

The slicing process can be performed, for example, by the filesystem synthesis module and/or by a datastream generator, and may take place inline as the datastream is being generated, or after the datastream has been generated and stored. The slicing process may be based on the file characteristics that were specified in connection with the configuration of the filesystem and include, for example, total size of the file collection, collection growth, average size of each entity (file) in the collection, and variance in the size of the entities in the collection. To illustrate, the file characteristics may specify that 13 files (File A to File M) are to be created, whose average size is 20 MB. Thus, the slicing process will slice 13 pieces from the datastream, while also ensuring that the average size of the collection of 13 pieces is 20 MB.

The particular portion(s) of the datastream 1000 that are targeted by the slicing process can vary as necessary to ensure that the resulting group of 13 files, in this example, collectively possess the desired characteristics 1002. Thus, the slicing process can take the characteristics of the datastream 1000 into account when making decisions about which data to cut, and when/where, from the datastream 1000. The slicing of the datastream 1000 may, or may not, be random. In some embodiments, the slicing can target, or avoid, one or more particular portions of the datastream 1000, such as the first 1 GB for example, or the middle 10 GB, although neither approach is necessarily required. In still other embodiments, the slicing process, which may be a virtual process, may be performed in a uniform manner over the entire datastream 1000.

With continued reference to FIG. 4, and as noted earlier, the data slices taken from the datastream 1000 are then used to populate the filesystem 900. Each slice corresponds to, and may constitute, a particular file. In some embodiments, the files in the filesystem 900 are sequentially created, using the data taken from the datastream. This file creation may be performed in tandem with the slicing process such that upon slicing, the slice data is immediately used to populate the corresponding file. In other cases, one or more of the slices can be made and stored for later use in populating one or more files of a collection of files. Once the simulated files have been populated with data from the datastream 1000, the collection of files can then be used in the testing and evaluation, for example, of a backup application and/or deduplication engine.

Figure 6:
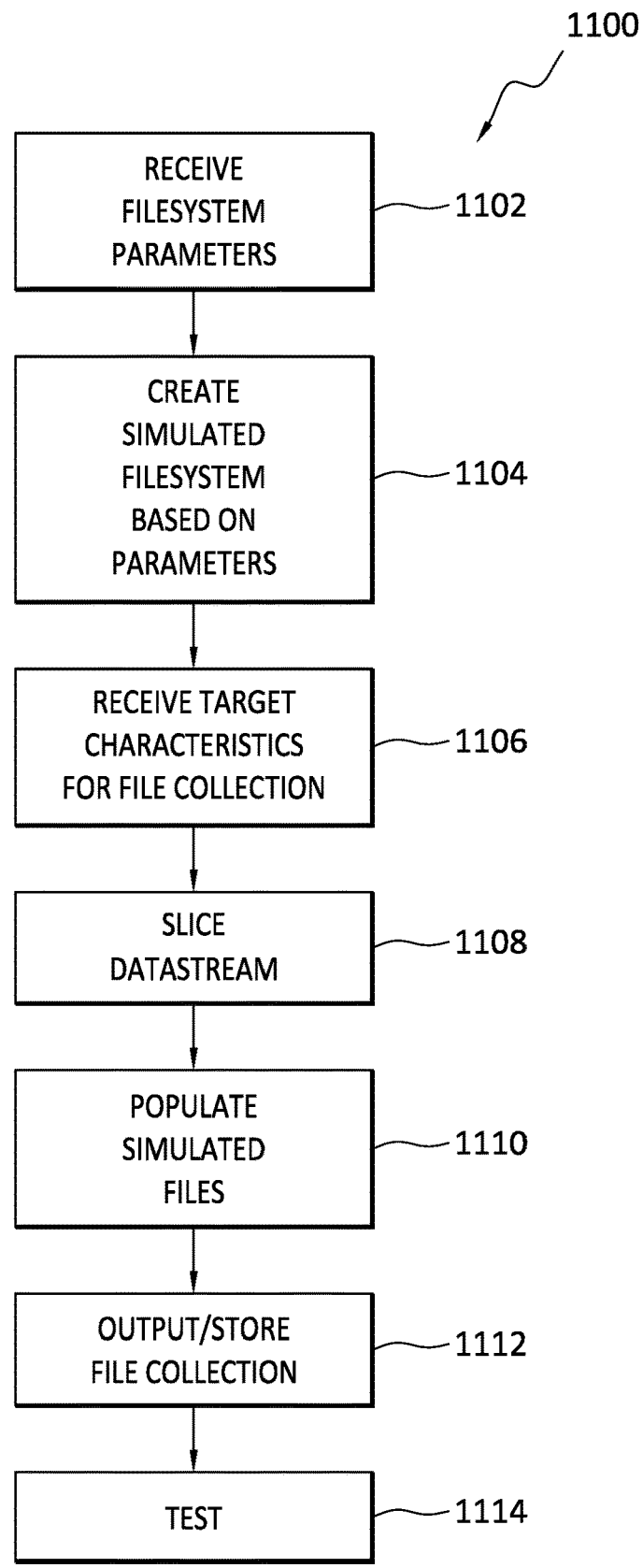
FIG. 6 is a flow diagram that discloses some general aspects of a method for creating a gen-0 file collection.

With continued attention to FIG. 5, and referring now to FIG. 6 as well, details are provided concerning methods for creating a simulated filesystem, and then generating a collection of files from a datastream, where one example of such a method is denoted generally at 1100. Part, or all, of the method 1100 can be performed by a filesystem synthesis module, for example.

In general, the method disclosed in FIG. 6 may be employed for creation of a collection of files that does not yet exist. As such, the method disclosed in FIG. 6 and discussed herein may be referred to as a method of generating a base collection of files. As discussed in connection with FIG. 7 for example, and by way of contrast with FIG. 6, an existing collection of files can be morphed forward or backward to another generation of that existing collection of files.

The example method 1100 may begin when one or more filesystem parameters are received 1102 that specify various attributes targeted for inclusion in a simulated filesystem that is to be created. The parameters can then be used to create 1104 a simulated filesystem.

Before, during, or after, creation 1104 of the simulated filesystem, target characteristics for a file collection, to be stored in the simulated filesystem, are received 1106. As noted herein, and in the Related Applications, such target characteristics may include, for example, compressibility, commonality, data change rate, and clustering. Various other target characteristics for a file collection can additionally, or alternatively, be received 1106. It is noted that processes 1102 and 1106 can be performed in parallel, or sequentially as shown in FIG. 6.

Next, a datastream is sliced 1108 into data portions that correspond to the files to be included in the file collection. In general, the files are carved out of the datastream 1108 one after another from a single large stream of data. The datastream may be generated prior to, or concurrently with, the slicing process 1108, and the datastream that is sliced 1108 possesses the target characteristics that are desired to be reflected in the file collection. In at least some embodiments, the target characteristics are used as a basis for generation of the datastream, and/or the target characteristics are used to drive the datastream slicing process 1108, so as to ensure that the file collection ultimately created collectively reflects the target characteristics. It is noted that processes 1104 and 1108 can be performed on a delta basis, that is, at each file level.

After, or during, the datastream slicing process 1108, the resulting data portions of the datastream are used to populate 1110 the simulated files that were created 1104. In at least some embodiments, the simulated files are populated 1110 in a sequence that corresponds to the order in which data slices are taken 1108 from the datastream, although that sequence is not necessarily required. It is noted that the files occupy data so the sizes of the files are simulated in the process 1100. Moreover, the collective size of this simulated file system is same as the size of the data taken from the datastream.

After the simulated files are populated 1110 with data from the datastream, the collection of files can be stored and/or output 1112 to an end user. The file collection may be stored 1112, for example, at a datacenter, client, backup server, and/or other entities in an operating environment.

Additionally, or alternatively, the file collection can be transmitted 1112 to an end user, such as a backup server that includes a backup application, for testing and evaluation 1114 purposes. For example, a backup application can create a backup using the file collection, and then transmit the backup to a deduplication engine for deduplication, prior to storage of the backup at a datacenter or other target. In this way, the operation of the backup application and/or deduplication engine can be tested with the use of files that mimic real world files such as may be created by clients at a production site and transmitted to a backup server for creation of a backup and deduplication.

When the backup application runs and takes a backup of the file collection for the first time, the backup applications scans all the files, reads the data in the files, and sends the data to the dedupe engine. Even when the carve-out sequence and backups sequence are not the same as each other, the dedupe engine sees the backup data as being very close to having the same characteristics as if the original stream were written as a single large file. Thus, the desired dedupe/compression/commonality can still be achieve when the data is processed and sent by the backup application. Accordingly, even if the backup application is not able to directly process the long datastreams, it can still operate effectively with the simulated carved-out file system.

E. Morphing a Simulated File Collection

Figure 7:
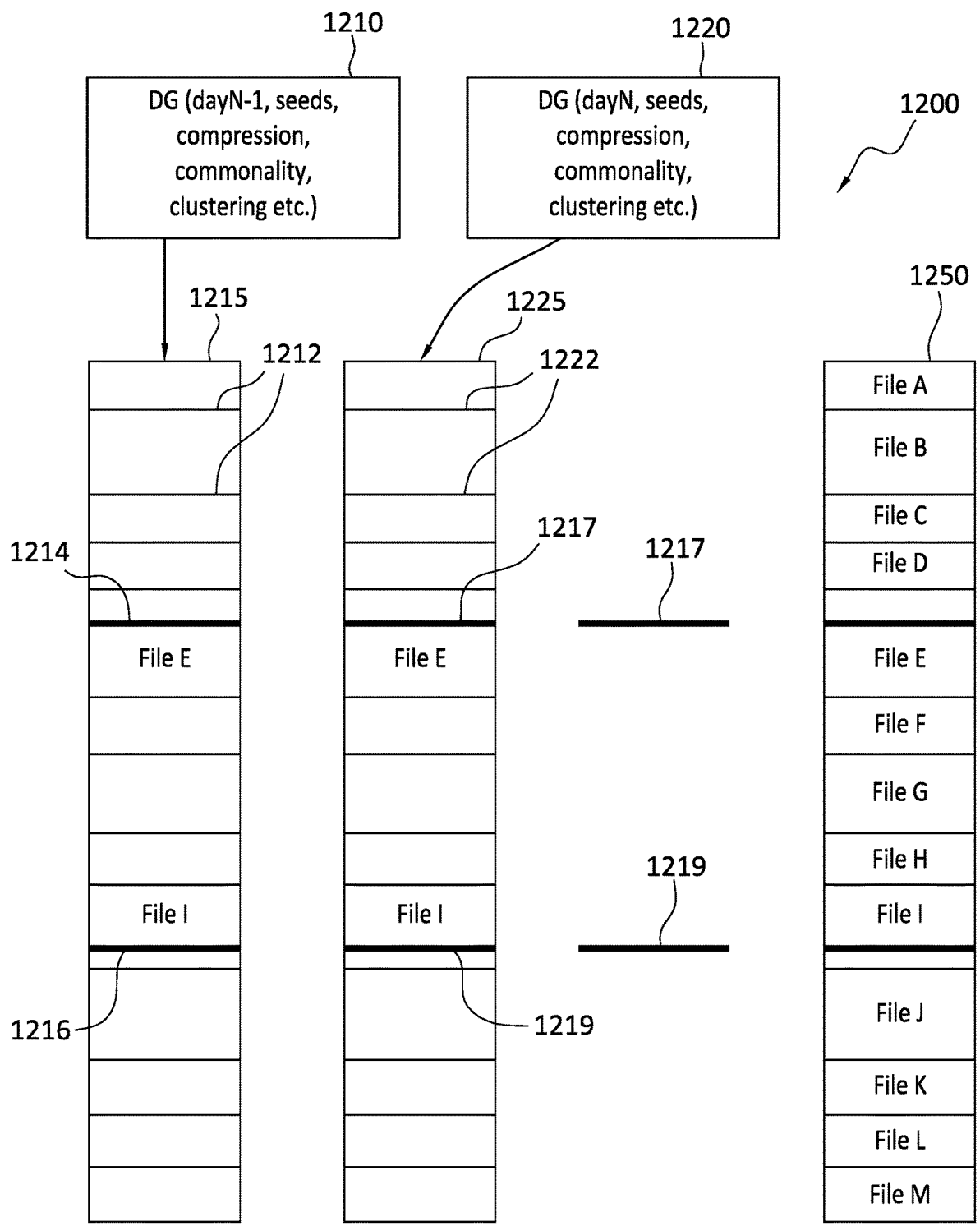
FIG. 7 discloses an example arrangement in which datastreams are compared and a file collection updated based on the comparison.

Turning next to FIG. 7, details are provided concerning processes and an arrangement for morphing a file collection forward from one generation to another. In the illustrated example, a file collection is morphed from generation N−1 to generation N. However, a file collection can be morphed forward multiple generations, and morphed backward one or more generations. Thus, the example of FIG. 7 is presented for purposes of illustration and does not limit the scope of the invention.

It was noted in one or more of the Related Applications that a data generation algorithm can regenerate streams that depict a known change rate. Thus, it is possible to re-apply the same carving logic utilizing the method of FIG. 6 and recreate all files and process these with a backup application. In this way, reprocessing of the file collection by the dedupe engine will generate the desired dedupabilty along with the compression/commonality, and any other characteristics of interest. However, this approach does not reflect the typical real life case, since only a small fraction of files actually change between generations. Moreover, this approach would require all files to be written again, and so is not particularly efficient in terms of time and processing resources utilized.

Thus, the example method of FIG. 7 generally involves generating a datastream corresponding to the generation N−1, and generating another stream corresponding to the generation N. Generation of these two datastreams can be performed as disclosed in the Related Applications. The two datastreams are sequentially compared to identify the differences between the two streams and, at the same time, the method also moves forward in the files that are being compared. Whenever compared data is the same, no overwrite of the data in the file is performed, but when the data is different, an overwrite is performed and, in that way, certain files that map to the changed areas are modified. Since the streams for generation N−1 and generation N can be generated at very high rate, as disclosed in the Related Applications, and the compare operation is likewise performed relatively quickly, changes to the simulated filesystem can be effective relatively quickly. Thus, all files that did not map to changed areas remain unmodified. It is noted that comparing datastreams is one way to identify changes that need to be made in order to morph a file collection, while another approach to identify changes is the use of an interface as discussed below in connection with FIG. 7.

Now, when the backup application runs and performs a backup of the simulated filesystem, the backup application can very quickly skip all files that have not changed and read only the files that have changed. When the contents of changed files are sent to dedupe engine, the modified data has almost the same dedupability, commonality, and compressibility that were configured for the data generation algorithm that generated the datastream from which the file data was taken. Thus, by having two incoming datastreams, and by comparing their contents, it is possible to very quickly morph a filesystem forward from one generation to another. As well, the same morphing logic can be applied to perform a reverse morphing process where data that is written on the mapped files is taken from generation N−1 rather from the generation N.

It is to be noted that in some embodiments, and as disclosed in the Related Applications, it is possible to make this work with just the gen 0 datastream. For example, in a forward morphing process where X is the value of the generation to which a file collection is to be forward morphed from generation N, it is enough to have a generation X mask, and the gen-0 datastream. The forward morphing process can read the X mask and then alter any block of the gen-N file collection whose generation value is greater than N in the X mask utilizing gen-0 datastream. Finally, it is to be noted that it is possible to make this work with just the generation mask X as that mask signifies the changes that are needed beyond generation N and the impacted areas can be read, modified from generation N to generation X, and then written back. It is to be noted that the last scheme should not be utilized if the gap between N to X is quite high as that will require excessive amount of read/modify/write and thus slowing the process.

For a reverse morphing process in which a file collection of generation X is to be reverse morphed to a prior generation N of that file collection, only generation N mask and generation X mask are needed, along with the gen-0 datastream. In general, the generation N mask value and generation X mask value are compared to each other and the gen-0 datastream transformed to gen-N state, or not, based on the outcome of that comparison. That is, when the generation X value of a block is the same as the generation N value of that block, the block is not reverted, but when the generation X value of the block is different from the generation N value, the gen-0 block is transformed to generation N and the block is then written to the file to which it belongs. One example of a reverse morphing process is discussed later in connection with FIG. 9.

With particular reference now to the arrangement and method disclosed in FIG. 7, one example implementation 1200 involves a first set of inputs 1210 which constitute characteristics to be implemented in a corresponding datastream 1215. The inputs 1210 may include, and as also noted in the Related Applications, a generation designation for the datastream, seed(s) used to generate the datastream, and desired compression, commonality, and other, characteristics for the datastream 1215 that is to be generated. In this example, the datastream 1215 is a generation N−1 datastream. Each of the subdivisions 1212 in the datastream 1215 denotes a file boundary in the datastream. Similarly, another set of inputs 1220, which may or may not be the same as the inputs 1210, constitute characteristics to be implemented in a corresponding generation N datastream 1225. Each of the subdivisions 1222 in the datastream 1215 denotes a file boundary in the datastream. As indicated in FIG. 7, the two datastreams 1215 and 1225 map to the same set of files.

With continued reference to the example of FIG. 7, it can be seen that a comparison of the generation N−1 datastream 1215 with the generation N datastream 1225 reveals that only small portions of two different files, File E and File I, have changed between the generation N−1 datastream 1215 and the generation N datastream 1225. That is, File E portion 1214 of the generation N−1 datastream 1215 has changed to File E portion 1217 in the generation N datastream 1225, and File I portion 1216 of generation N−1 datastream 1215 has changed to File I portion 1219 in the generation N datastream 1225. Thus, the generation N file collection 1250 N is created by overwriting, in the file collection 1250, the portion 1214 with portion 1217, and overwriting portion 1216 with portion 1219, and no other portions of Files E and I, or any other files, are modified, or need to be.

In more detail, an example interface for a situation where an N−1 generation datastream and N generation datastream are employed could take the following form:

Reset-offsets(N−1, N, other parameters)
Get-me-Next-change(offset-where-change-is, buffer)
Get-me-Next-change(offset-where-change-is, buffer)
Get-me-Next-change(offset-where-change-is, buffer)
. . . Done.

With this example interface, on the first call, the logic returns the portion 1217 in the supplied buffer and returns an offset that corresponds to somewhere in file E. On the next call, the logic returns portion 1219 in the buffer and an offset that corresponds to somewhere in file I. In either case, the logic knows exactly where the next change will be, whether by a datastream comparison, or the use of a gen-0 datastream along with N−1 and N masks.

As the example of FIG. 7 illustrates, embodiments of the invention can be economical in terms of the time and processing resources needed since only those portions of files that have been changed are overwritten, and there is no need to rewrite entire files or groups of files. Moreover, because the modified data takes the form of the file collection 1250, the modified data can be readily handled and processed by a backup application and deduplication engine.

It can also be seen, with continued reference to the example of FIG. 7, that comparison of the generation N−1 datastream 1215 with the generation N datastream 1225 enables the file collection 1250 to be reverse morphed from generation N to generation N−1. Particularly, a comparison of the datastreams reveals that File E portion 1217 of the generation N datastream 1225 corresponds to File E portion 1214 in the generation N−1 datastream 1215, and File I portion 1219 of the generation N datastream 1215 corresponds to File I portion 1216 in the generation N−1 datastream 1215. Thus, the file collection 1250 can be reverse morphed from generation N to generation N−1 by overwriting portion 1217 with portion 1214, and overwriting portion 1219 with portion 1216.

F. Aspects of Some Example Methods

Figure 8:
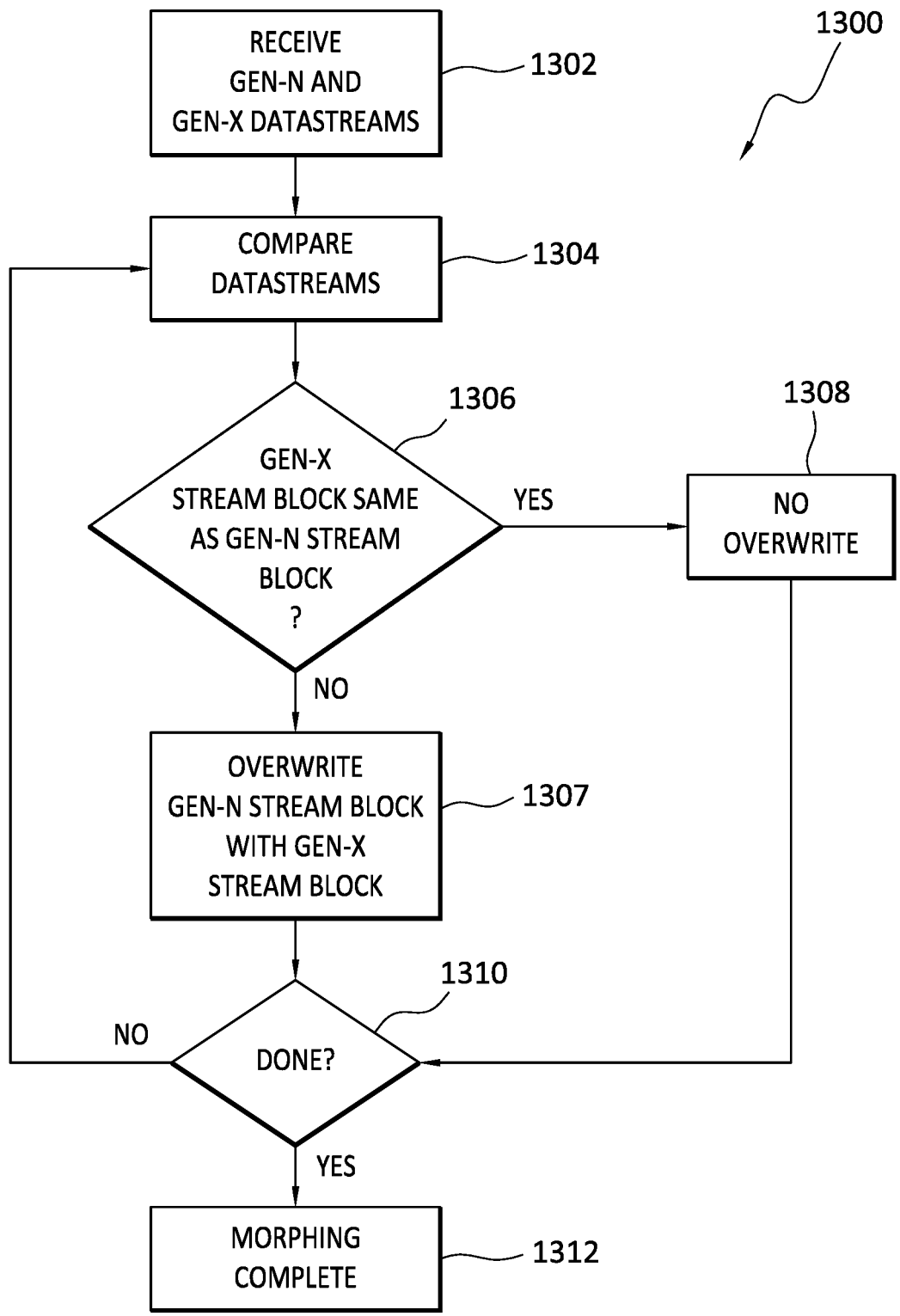
FIG. 8 is a flow diagram disclosing aspects of an example method for morphing a file collection to a different generation.

With reference now to FIG. 8, details are provided concerning aspects of example methods for morphing a simulated file collection from one generation to another, wherein one example of a file collection morphing method is denoted generally at 1300. In the example of FIG. 8, a file collection of generation N is morphed forward to generation X although, as noted herein, a file collection may be reverse morphed as well.

The example method 1300 can begin at 1302 wherein a gen-N datastream and a gen-X datastream are received. Next, the gen-N datastream and the gen-X datastream are compared with each other 1304 to determine 1306 whether any changes have been made to the gen-N datastream that are reflected in the gen-X datastream. This comparison 1304 can be performed on a block basis, file basis, or any other suitable basis. Thus, while the illustrative example of FIG. 8 employs a block basis comparison, the scope of the invention is not limited to that example.

With continued reference to FIG. 8, the determination 1306 can comprise a determination as to whether or not the gen-X datastream block is the same as the gen-N datastream block. If the gen-X datastream block is determined 1306 to be the same as the gen-N datastream block, the method advances to 1308 and no overwrite of the gen-N datastream block is performed. On the other hand, if it is determined 1306 that the gen-X datastream block is different from the gen-N datastream block, then the gen-N datastream block is overwritten 1307 with the gen-X datastream block.

Whether a block is overwritten 1307, or not 1308, the method 1300 then advances to 1310 where a determination is made as to whether or not the datastream comparison 1304 has been completed. If not, the method 1300 returns to 1304 and, if so, the method advances to 1312, completing the morphing of the file collection from generation N to generation X. It is noted with respect to the method of FIG. 8 that X=N+a, where a is any integer ≥1. Thus, a file collection can be morphed forward any number of generations.

With continued reference to FIG. 8, it can be seen that the method 1300 can be readily adapted to perform a reverse morphing of a gen-X file collection to a gen-N file collection, where N=X−a, and a is any integer ≥1. In particular, if it is determined at 1306 that the generation value of the block in the gen-X datastream is not the same as the generation value of that same block in the gen-N datastream, then, in a reverse morphing scenario, the gen-X version of the block is overwritten with the gen-N version of that block, thus reverting the block from gen-X to gen-N. Except for this change at 1307, the method 1300 is otherwise applicable to reverse morphing of a file collection from gen-X to gen-N.

Figure 9:
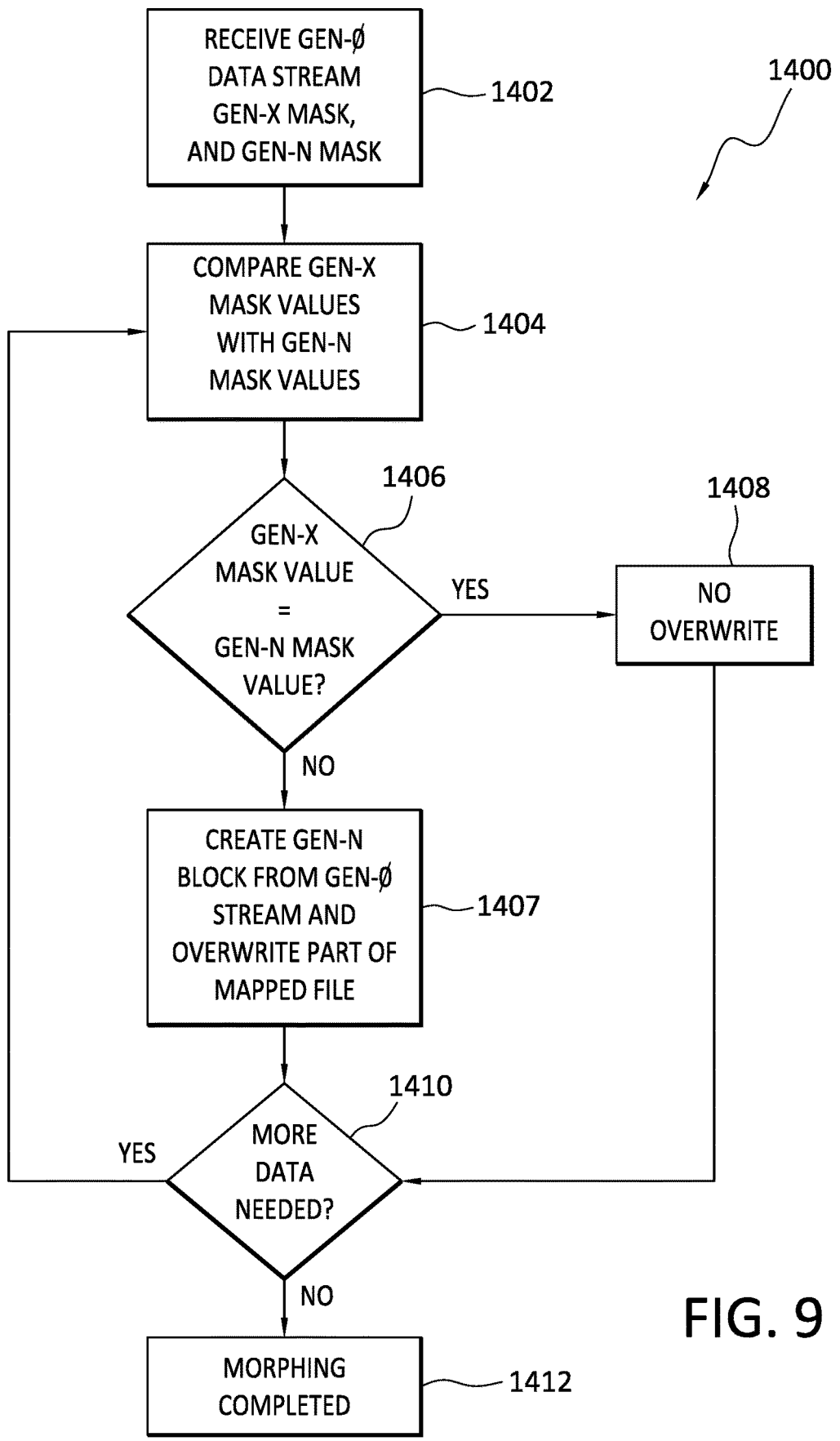
FIG. 9 is a flow diagram disclosing aspects of an example method for reverse morphing a file collection to a different generation.

Directing attention finally to FIG. 9, details are provided concerning methods and processes for reverse morphing a gen-X file collection to a gen-N file collection, where one example method is denoted generally at 1400. It is noted that reverse morphing can be performed over a single generation, or multiple generations. Thus, the example method of FIG. 9 is like that of FIG. 8, in that both methods can be used to morph a file collection from one generation to another. However, aside from the fact that FIG. 8 is concerned with forward morphing and FIG. 9 is concerned with reverse morphing, the method of FIG. 8 involves the comparison of blocks of data of two different datastreams, while the method of FIG. 9 involves the comparison of mask values. Thus, both methods are effective in morphing a file collection from one generation to another, but employ different respective mechanisms to do so. Moreover, the method of FIG. 9 can be performed with only a single datastream. In general, the gen-0 datastream is used as a basis for the generation of modified blocks, if those are needed for morphing.

The example method 1400 can begin when a gen-0 datastream, gen-X mask, and gen-N mask are received 1402. The respective block generation values in the gen-X mask and gen-N mask are then compared 1404. If those block generation values are determined 1406 to be the same, then no change to the block is needed 1408. That is, the fact that the block generation values are the same indicates that the gen-X and gen-N versions of the block are the same. Note that as used herein, "generation value" refers to the generation of a particular block of a particular datastream. Thus, for example, a gen-3 mask entry having a generation value of 2 means that the block associated with that entry was last modified in the second generation datastream.

On the other hand, if it is determined 1406 that the respective block generation values in the gen-X mask and gen-N mask are different, then the corresponding block in the gen-0 datastream is transformed to the gen-N value of that block 1407 and the transformed block is then written to the file to which it belongs. Whether the gen-0 block is transformed and written to the file 1407, or not 1408, the method 1400 then advances to 1410 where a check is performed to determine if more data is needed or not.

When no more data is needed, the mask comparison, and any corresponding overwrites, are determined 1410 to be complete, and the process 1400 advances to 1412 and the process of morphing the file collection from gen-X to gen-N is completed. On the other hand, If additional data is needed, the mask comparison, and any corresponding overwrites, are determined 1410 not to be complete, then the process 1400 returns to 1404.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions which are executable by one or more hardware processors to perform operations comprising:
   receiving a set of parameters for a simulated filesystem;
   creating the simulated filesystem based on the parameters, wherein the simulated filesystem comprises a plurality of simulated files that mimic real world files and data;
   receiving a set of target characteristics for a collection that comprises the simulated files;
   based on the set of target characteristics, slicing a datastream into a grouping of data slices, wherein each of the data slices is a size of a respective one of the plurality of simulated files;
   populating the plurality of simulated files with respective data slices of the grouping of data slices, wherein each of the plurality of simulated files contains a single data slice of the grouping of data slices; and
   testing and evaluating a backup application using the simulated files in the collection.

2. The non-transitory storage medium as recited in claim 1, wherein the set of target characteristics comprises one or more of dedupability, compressibility, commonality, and clustering.

3. The non-transitory storage medium as recited in claim 1, wherein the target characteristics are representative of characteristics present in the datastream.

4. The non-transitory storage medium as recited in claim 1, wherein the simulated files in the collection collectively possess the set of target characteristics.

5. The non-transitory storage medium as recited in claim 1, wherein the filesystem parameters comprise a configuration of a file structure of the simulated filesystem.

6. The non-transitory storage medium as recited in claim 1, further comprising receiving parameters of the collection and the parameters comprise: a total size of the collection; growth of the collection; and average size of each file in the collection.

7. The non-transitory storage medium as recited in claim 1, wherein receipt of parameters for the simulated filesystem is performed in parallel with receipt of the set of target characteristics for the collection.

8. The non-transitory storage medium as recited in claim 1, wherein both the creation of the simulated filesystem and slicing of the datastream are performed on a file level basis.

9. The non-transitory storage medium as recited in claim 1, wherein a collective size of the collection is the same size as a collective size of the data slices taken from the datastream.

10. A method, comprising the operations:

receiving a set of parameters for a simulated filesystem;

creating the simulated filesystem based on the parameters, wherein the simulated filesystem comprises a plurality of simulated files that mimic real world files and data;

receiving a set of target characteristics for a collection that comprises the simulated files;

based on the set of target characteristics, slicing a datastream into a grouping of data slices, wherein each of the data slices is a size of a respective one of the plurality of simulated files;

populating the plurality of simulated files with respective data slices of the grouping of data slices, wherein each of the plurality of simulated files contains a single data slice of the grouping of data slices; and testing and evaluating a backup application using the simulated files in the collection.

11. The method as recited in claim 10, wherein the set of target characteristics comprise one or more of dedupability, compressibility, commonality, and clustering.

12. The method as recited in claim 10, wherein the simulated files in the collection collectively possess the set of target characteristics.

13. The method as recited in claim 10, wherein both the creation of the simulated filesystem and slicing of the datastream are performed on a file level basis.

14. A system, comprising:

one or more hardware processors; and a non-transitory storage medium having stored therein instructions which are executable by the one or more hardware processors to perform operations comprising receiving a set of parameters for a simulated filesystem;

creating the simulated filesystem based on the parameters, wherein the simulated filesystem comprises a plurality of simulated files that mimic real world files and data;

receiving a set of target characteristics for a collection that comprises the simulated files;

based on the set of target characteristics, slicing a datastream into a grouping of data slices, wherein each of the data slices is a size of a respective one of the plurality of simulated files;

populating the plurality of simulated files with respective data slices of the grouping of data slices, wherein each of the plurality of simulated files contains a single data slice of the grouping of data slices; and testing and evaluating a backup application using the simulated files in the collection.

15. The system as recited in claim 14, wherein the set of target characteristics comprises one or more of dedupability, compressibility, commonality, and clustering.

16. The system as recited in claim 14, wherein the simulated files in the collection collectively possess the set of target characteristics.

17. The system as recited in claim 14, wherein both the creation of the simulated filesystem and slicing of the datastream are performed on a file level basis.

* * * * *